United States Patent
Roy et al.

(10) Patent No.: US 12,130,398 B2
(45) Date of Patent: Oct. 29, 2024

(54) TRAINING DATA FOR MACHINE LEARNING SEISMIC INVERSION

(71) Applicant: Chevron U.S.A. Inc., San Ramon, CA (US)

(72) Inventors: Prasenjit Roy, Katy, TX (US); Yang Zhang, Sugar Land, CA (US); Xinfa Zhu, Houston, TX (US); Reynaldo Cardona, Katy, TX (US); Yong Hua, Alberta (CA); Kun Fu, Houston, TX (US); Bassel Mouloud Almoughraby, Spring, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 416 days.

(21) Appl. No.: 17/672,486

(22) Filed: Feb. 15, 2022

(65) Prior Publication Data
US 2023/0258838 A1    Aug. 17, 2023

(51) Int. Cl.
| | |
|---|---|
| *G01V 1/48* | (2006.01) |
| *G01V 1/00* | (2006.01) |
| *G01V 1/46* | (2006.01) |
| *G01V 1/50* | (2006.01) |
| *G06F 18/214* | (2023.01) |

(52) U.S. Cl.
CPC ............... *G01V 1/50* (2013.01); *G01V 1/003* (2013.01); *G01V 1/46* (2013.01); *G06F 18/214* (2023.01); *G01V 2210/1299* (2013.01); *G01V 2210/62* (2013.01)

(58) Field of Classification Search
CPC . G01V 1/50; G01V 1/003; G01V 1/46; G01V 2210/129; G01V 2210/62; G06F 18/214
See application file for complete search history.

(56) References Cited

U.S. PATENT DOCUMENTS

| | | | |
|---|---|---|---|
| 11,899,148 B1* | 2/2024 | Zhang | G01V 1/282 |
| 2011/0103187 A1 | 5/2011 | Albertin | |
| 2018/0128929 A1* | 5/2018 | Roy | G01V 1/282 |
| 2018/0329096 A1 | 11/2018 | Magill | |
| 2020/0041677 A1* | 2/2020 | Roy | G01V 1/345 |

FOREIGN PATENT DOCUMENTS

WO    WO-2021130512 A1 *  7/2021

OTHER PUBLICATIONS

Corte et al., "Deep neural network application for 4D seismic inversion to changes in pressure and saturation: Optimizing the use of synthetic training datasets", Geophysical Prospecting. 2020, 68, 2164-2185 (Year: 2020).*
Hami-Eddine Kamal et al: "Neural Networks to Quantify the Pertinence of AVA Effects", GSH Journal, Jun. 30, 2016 (Jun. 30, 2016), pp. 11-15, XP055810196.
PCT International Search Report and Written Opinion for International Application No. PCT/IB2021/052828 mailed Jun. 11, 2021.

* cited by examiner

*Primary Examiner* — Krystine E Breier
(74) *Attorney, Agent, or Firm* — ESPLIN & ASSOCIATES, PC

(57) ABSTRACT

Well data (e.g., well log) may be divided into multiple segments, and different samplings of data in the individual segments may be performed to increase the amount of data that is used to train a seismic inversion model. Synthetic well data may be generated from real well data to increase the amount of well data from which sampling is performed.

18 Claims, 6 Drawing Sheets

TRAINING DATA FOR MACHINE LEARNING SEISMIC INVERSION

FIELD

The present disclosure relates generally to the field of improving seismic inversion using improved training data.

BACKGROUND

Inversion may be performed on seismic data to identify subsurface characteristics. Use of machine learning techniques to perform subsurface inversion may require voluminous amounts of training data, which may not be available. For example, it may be cost prohibitive to perform sufficient exploration of a subsurface region (e.g., by drilling wells) to gather sufficient amount of training data.

SUMMARY

This disclosure relates to improving seismic inversion using improved training data. Well information and/or other information may be obtained. The well information may define subsurface configuration of wells. The subsurface configuration of wells may be defined by values of multiple subsurface properties. Individual subsurface configuration of wells defined by the well information may be divided into multiple segments. Individual segments may include a portion of the subsurface configuration of wells defined by the well information. The improved training data for a seismic inversion model may be generated based on sampling of the individual segments and/or other information. The sampling of the individual segments may include separate random sampling with replacement of the multiple subsurface properties. The seismic inversion model may be trained using the improved training data. The trained seismic inversion model may be stored in a non-transient storage medium.

A system for improving seismic inversion using improved training data may include one or more electronic storage, one or more processors and/or other components. The electronic storage may store well information, information relating to wells, information relating to subsurface configuration of wells, information relating to segments of subsurface configuration of wells, information relating to improved training data, information relating to a seismic inversion model, information relating to sampling of segments of subsurface configuration of well, information relating to training of the seismic inversion model, information relating to storage of the trained seismic inversion model, information relating to usage of the trained seismic inversion model, and/or other information.

The processor(s) may be configured by machine-readable instructions. Executing the machine-readable instructions may cause the processor(s) to facilitate improving seismic inversion using improved training data. The machine-readable instructions may include one or more computer program components. The computer program components may include one or more of a well component, division component, improved training data component, train component, storage component, seismic reflection component, seismic inversion component, and/or other computer program components.

The well component may be configured to obtain well information, and/or other information. The well information may define subsurface configuration of wells. The subsurface configuration of wells may be defined by values of multiple subsurface properties. In some implementations, the wells include one or more synthetic wells, and the subsurface configuration of the wells defined by the well information may include synthetic subsurface configuration of the synthetic well(s). In some implementations, the synthetic well(s) may be generated from one or more real wells by varying sand properties of the real well(s) while retaining shale properties of the real well(s).

The division component may be configured to divide individual subsurface configuration of wells defined by the well information into multiple segments. Individual segments may include a portion of the subsurface configuration of wells defined by the well information. In some implementations, the individual segments may cover a range of tens to hundreds of feet.

The improved training data component may be configured to generate the improved training data for one or more seismic inversion models. The improved training data may be generated based on sampling of the individual segments and/or other information. The sampling of the individual segments may include separate random sampling with replacement of the multiple subsurface properties. In some implementations, the separate random sampling with replacement of the multiple subsurface properties may be performed for a top layer, a bottom layer, and/or other layers. In some implementations, the sampling of the individual segments to generate the improved training data for the seismic inversion model(s) may be performed hundreds to thousands of times for the individual segments.

The train component may be configured to train the seismic inversion model(s). The seismic inversion model(s) may be trained using the improved training data and/or other information. In some implementations, the improved training data includes pairings of corresponding seismic attributes and subsurface characteristics. In some implementations, the subsurface characteristics may include acoustic impedance, shear impedance, density, and/or other subsurface characteristics.

The storage component may be configured to store the trained seismic inversion model(s). The trained seismic inversion model(s) may be stored in one or more non-transient storage media.

The seismic reflection component may be configured to obtain seismic reflection information and/or other information. The seismic reflection information may define seismic reflection response in a subsurface region.

The seismic inversion component may be configured to determine subsurface characteristics in the subsurface region. The subsurface characteristics in the subsurface region may be determined by performing seismic inversion of the seismic reflection response in the subsurface region using the trained seismic inversion model.

In some implementations, the seismic reflection response may be calibrated, and seismic attributes may be computed from the calibrated seismic reflection response. The trained seismic inversion model(s) may be applied to the seismic attributes to perform the seismic inversion of the seismic reflection response in the subsurface region.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to improving seismic inversion using improved training data. Well data (e.g., well log) may be divided into multiple segments, and different samplings of data in the individual segments may be performed to increase the amount of data that is used to train a seismic inversion model. Synthetic well data may be generated from real well data to increase the amount of well data from which sampling is performed.

Figure 1:
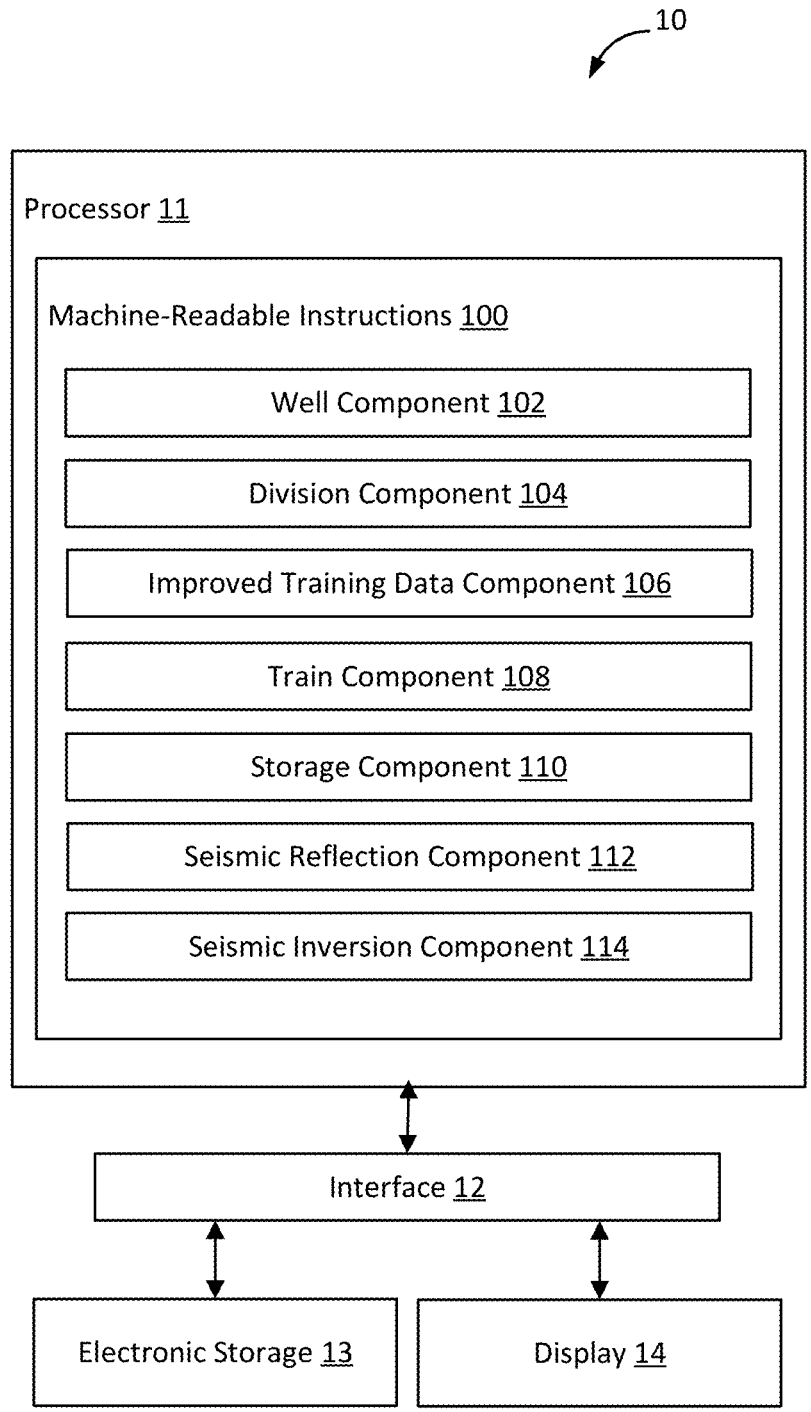
FIG. 1 illustrates an example system for improving seismic inversion using improved training data.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Well information and/or other information may be obtained by the processor 11. The well information may define subsurface configuration of wells. The subsurface configuration of wells may be defined by values of multiple subsurface properties. Individual subsurface configuration of wells defined by the well information may be divided into multiple segments by the processor 11. Individual segments may include a portion of the subsurface configuration of wells defined by the well information. The improved training data for a seismic inversion model may be generated by the processor 11 based on sampling of the individual segments and/or other information. The sampling of the individual segments may include separate random sampling with replacement of the multiple subsurface properties. The seismic inversion model may be trained by the processor 11 using the improved training data. The trained seismic inversion model may be stored in a non-transient storage medium by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store well information, information relating to wells, information relating to subsurface configuration of wells, information relating to segments of subsurface configuration of wells, information relating to improved training data, information relating to a seismic inversion model, information relating to sampling of segments of subsurface configuration of well, information relating to training of the seismic inversion model, information relating to storage of the trained seismic inversion model, information relating to usage of the trained seismic inversion model, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present well information, information relating to wells, information relating to subsurface configuration of wells, information relating to segments of subsurface configuration of wells, information relating to improved training data, information relating to a seismic inversion model, information relating to sampling of segments of subsurface configuration of well, information relating to training of the seismic inversion model, information relating to storage of the trained seismic inversion model, information relating to usage of the trained seismic inversion model, and/or other information.

Seismic data for a subsurface region may be obtained by using sensors in a well to record various signals from geological formations (e.g., electrical, sonic, neutron, gamma ray, etc.). The signals may be processed and recorded as well logs. Thus, well logs may include information about the geological formation exposed by the well. Well logs provide information about characteristics of earth under the surface, such as type of lithology, pore fluid, porosity, density, etc. of the formation. However, the availability of well logs is limited by the location of wells. To make inference about characteristics of earth without wells, seismic data for a subsurface region may be obtained by measuring seismic reflection response in the subsurface region. Characteristics of materials (e.g., rocks, etc.) in the subsurface region (subsurface characteristics) may be derived by performing seismic inversion on the seismic data. Seismic inversion may refer to a process of transforming seismic data (e.g., seismic reflection information) into a quantitative and/or qualitative material property. For example, seismic inversion may refer to a process of transforming seismic data into quantitative and/or qualitative properties of rocks in a reservoir. Inverted information may be used as an indicator of resources (e.g., hydrocarbons) under the ground.

For example, the seismic data may be inverted to generate subsurface models of physical properties and processed to create seismic images that may be interpreted to identify subsurface geologic features, such as hydrocarbon deposits. However, traditional seismic inversion is technically challenging, time consuming, expensive and requires significant manual input. Traditional inversion methods may only use a limited set of drilled well data if available in the study area and is not effective in the frontier exploration where there are no drilled wells.

Machine-learning approaches may be used to determine/estimate subsurface characteristics in a subsurface region more efficiently. For example, machine-learning-based seismic inversion (seismic inversion model) may be used to estimate lithology, fluid type, porosity, and/or other subsurface characteristics directly from seismic data. However, for the seismic inversion model to provide accurate results, sufficient amount of high quality training data must be available to train the seismic inversion model. Gathering high quality training data via physical exploration of the earth may be time consuming, risky, and costly.

The current disclosure enables generation of high quality training data for use in training seismic inversion models.

Rather than using physical exploration of earth to gather all training data, well data (e.g., real well log, synthetic well log) from wells (e.g., real wells, synthetic wells) are randomly sampled, and the randomly sampled data are used to generate data for use in training the seismic inversion model. Such generation of training data enables sufficient amount of high quality training data to be generated for use in training seismic inversion models.

Figure 3:
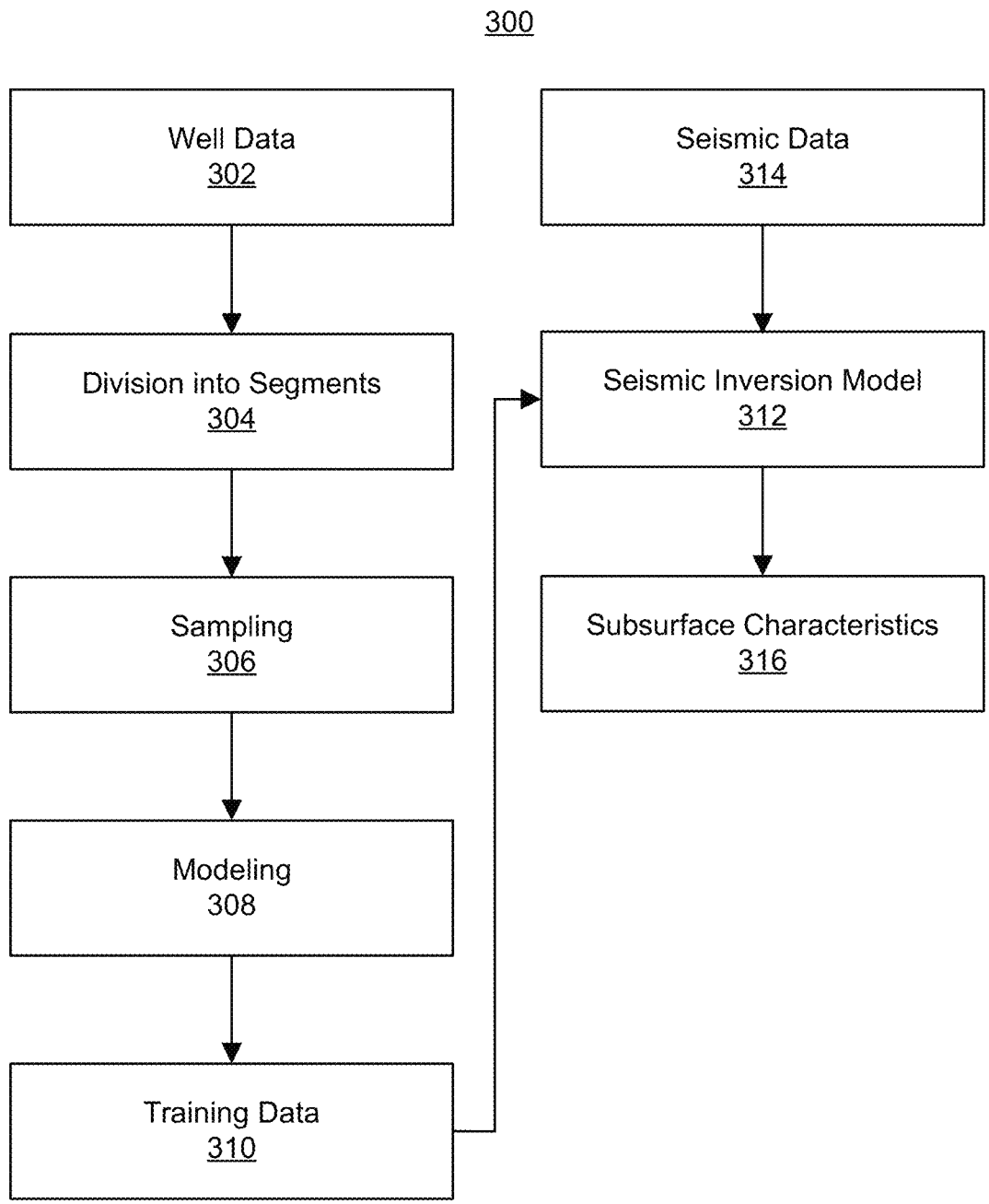
FIG. 3 illustrates an example process for improving seismic inversion using improved training data

FIG. 3 illustrates an example process 300 for improving seismic inversion using improved training data. In the process 300, well data 302 may be obtained. The well data 302 may include well logs from real wells and/or synthetic wells. The well data 302 may be divided into segments 304. The segments of well data may be sampled 306 to pick values of subsurface properties (e.g., P-wave velocity, shear wave velocity, density, porosity, proportion of shale) that will be used for modeling (e.g., forward modeling). The sampling of the well data may include sampling with replacement. The sampling of the well data may be performed for multiple layers (e.g., top layer, bottom layer) of modeling. The sampled data may be used to perform modeling 308, which is used to generate training data 310. The training data 310 may including pairings of (1) seismic attributes, which may be derived from seismic data, and (2) subsurface characteristics corresponding to the seismic attributes. The training data 310 may be used to train a seismic inversion model 312, with the seismic attributes provided as input and the subsurface characteristics corresponding to the seismic attributes provided as truth. The seismic inversion model 312 may be trained to perform inversion of seismic attributes into subsurface characteristics. Seismic data 314 for a subsurface region may be obtained and processed to determine the seismic attributes. The seismic attributes for the subsurface region may be provided as input into the seismic inversion model 312, which may provide as output subsurface characteristics 316 of the subsurface region.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate improving seismic inversion using improved training data. The machine-readable instructions 100 may include one or more computer program components. The machine-readable instructions 100 may include a well component 102, division component 104, improved training data component 106, train component 108, storage component 110, seismic reflection component 112, seismic inversion component 114, and/or other computer program components.

The well component 102 may be configured to obtain well information, and/or other information. Obtaining well information may include one or more of accessing, acquiring, analyzing, creating, determining, examining, generating, identifying, loading, locating, measuring, opening, receiving, retrieving, reviewing, selecting, storing, utilizing, and/or otherwise obtaining the well information. The well information component 102 may obtain well information from one or more locations. For example, the well information component 102 may obtain well information from a storage location, such as the electronic storage 13, electronic storage of a device accessible via a network, and/or other locations. The well information component 102 may obtain well information from one or more hardware components (e.g., a computing device, a component of a computing device) and/or one or more software components (e.g., software running on a computing device). In some implementations, the well information may be obtained from one or more users. For example, a user may interact with a computing device to input, upload, identify, and/or select the well(s) to be used, and the well information for the well(s) may be obtained. The well information may be stored within a single file or multiple files.

The well information may define subsurface configuration of one or more wells. A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). A well may be drilled in one or more directions. For example, a well may include a vertical well, a horizontal well, a deviated well, and/or other type of well.

The well information may define subsurface configuration of one or more real wells and/or one or more synthetic wells. A real well may refer to a well in the real world. A real well may refer to a physical well. A synthetic well may refer to a well that does not exist in the real world. A synthetic well may refer to a made-up well. A synthetic well may refer to a digital/virtual well. A synthetic well may include synthetic subsurface configuration. That is, the well information may define synthetic subsurface configuration of one or more synthetic wells.

Subsurface configuration of a well may refer to attribute, quality, and/or characteristics of the well. Subsurface configuration of a well may refer to type, property, and/or physical arrangement of materials (e.g., subsurface features) within the well and/or surrounding the well. Examples of subsurface configuration may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures. In some implementations, subsurface configuration of a well may be defined by values of one or more subsurface properties as a function of position (e.g., depth) within the well. A subsurface property may refer to a particular attribute, quality, and/or characteristics of the well. For example, subsurface configuration of a well may be defined by separate values of multiple subsurface properties (e.g., P-wave velocity, shear wave velocity, density, porosity, proportion of shale) at different depths.

Figure 4:
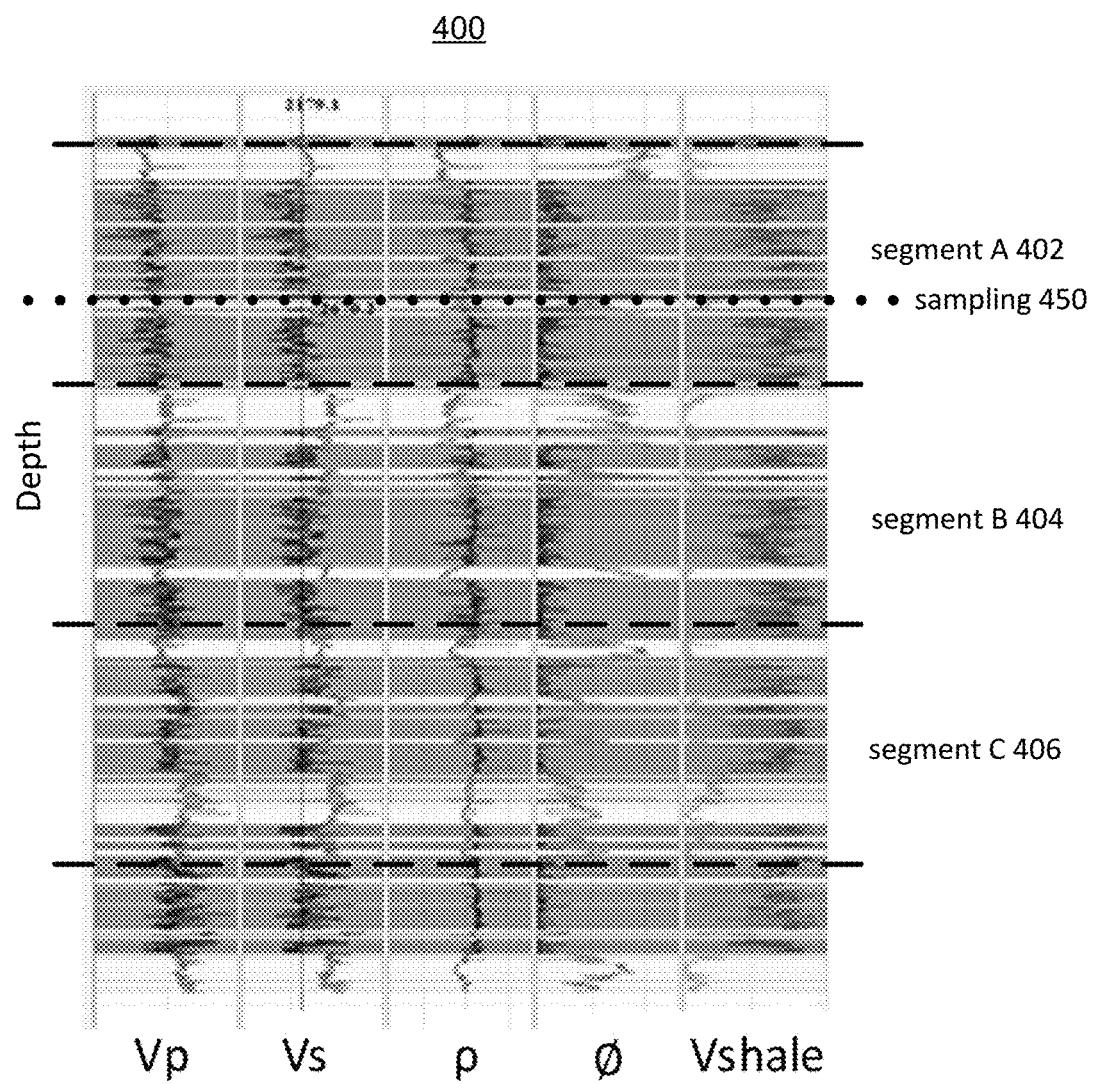
FIG. 4 illustrates example well logs

The well information may define subsurface configuration of a well by including information that describes, delineates, identifies, is associated with, quantifies, reflects, sets forth, and/or otherwise defines one or more of content, quality, attribute, feature, and/or other aspects of the subsurface configuration of well. In some implementations, the well information may include one or more well logs and/or associated information for a well. The well information may include a single well log or a suite of well logs for a well. For instance, the well information may include one or more well logs (of a real well, of a synthetic well), information determined/extracted from one or more well logs, information determined/extracted from one or more well cores, and/or other information. For example, the well information may include one or more well logs relating to one or more subsurface properties of a well, such as P-wave velocity, shear wave velocity, density, porosity, proportion of shale, and/or other subsurface properties of the well at different positions (depths) within the well. FIG. 4 illustrates example well logs 400 that provide values of P-wave velocity ($V_P$), shear wave velocity ($V_S$), density ($\rho$), porosity ($\emptyset$), proportion of shale ($V_{shale}$) for a well at different depths. Other types of well information are contemplated.

In some implementations, one or more synthetic wells may be generated from one or more real wells. A synthetic well may be generated from a real well by varying some properties of the real well while retaining other properties of the real well. For example, a synthetic well may be generated from a real well by varying sand properties (e.g., P-wave velocity, shear wave velocity, density, porosity) of the real well while retaining (keeping the same) shale properties (e.g., P-wave velocity, shear wave velocity, density) of the real well. Use of synthetic wells may be beneficial for subsurface region with limited number of real wells. Rock physics may be used to augment and/or replicate well data for use in generating training data. Rock physics may be used to expand on sand porosity in the synthetic wells. For example, a synthetic well may be generated from a real well by keeping the non-reservoir shale properties while changing the reservoir properties using rock physics empirical relationships as a function of porosities. For instance, sand properties in the synthetic well may be changed as a function of porosity using rock physics functions. Rock physics may be used to model changes in P-wave velocity and shear wave velocity with changes in sand porosity in the synthetic well. Other generation of synthetic wells is contemplated.

The division component 104 may be configured to divide individual subsurface configuration of wells defined by the well information into multiple segments. Individual segments may include a portion of the subsurface configuration of wells defined by the well information. Dividing the subsurface configuration of a well defined by the well information may include separating the subsurface configuration of the well into multiple segments. The subsurface configuration of the well may be separated based on depth. For example, the subsurface configuration of the well may be contained within one or more well logs, and the well log(s) may be divided into multiple segments so that individual segments include a part of the well log(s). For instance, referring to FIG. 4, the well logs 400 may be divided into a segment A 402, a segment B 404, a segment C 406, and/or segments so that the segments 402, 404, 406 include different parts of the well logs 400.

In some implementations, the subsurface configuration of the wells may be divided so that the individual segments cover a certain depth. For example, the subsurface configuration of the wells may be divided so that the individual segments cover a depth between a range of tens to hundreds of feet. Use of other ranges for the segments is contemplated. In some implementations, the depth covered by the individual segments may be controlled by a user. For example, a user may set the depth to be covered by individual segments, and the subsurface configuration of the wells may be divided using the depth set by the user. In some implementations, the depth covered by the individual segments may be controlled based on the desired number of segments. For example, the subsurface configuration of the wells may be divided to generate a certain number of segments, and the depth covered by the individual segments may be determined based on the number of segments into which the subsurface configuration of the wells is to be divided. Other division of the subsurface configuration of wells is contemplated.

The improved training data component 106 may be configured to generate the improved training data for one or more seismic inversion models. Training data for a seismic inversion model may refer to data that is used to train the seismic inversion model to perform seismic inversion. Improved training data may refer to training data that has been improved by including the amount of information contained in the training data. Improved training data may refer to training data that has been improved via inclusion of data generated from the sampling of the segments of subsurface configuration of wells. A seismic inversion model may refer to a computer model that performs seismic inversion. A seismic inversion model may refer to a computer model that receives seismic data/seismic attributes as input and provides subsurface characteristics as output. A seismic inversion model may be a machine-learning based model. The seismic inversion model may include one or more machine-learning structures that learns to output subsurface characteristics from seismic data/seismic attributes. For example, the seismic inversion model may include one or more of a neural network, a random forest model, a gradient boosted decision tree model, a support vector machine, a regression, and/or a Bayesian network. Use of other machine-learning structures is contemplated.

The improved training data may be generated based on sampling of the individual segments of the subsurface configuration of the wells and/or other information. Sampling of a segment of the subsurface configuration of a well may include taking/picking the subsurface configuration of the well at one or more depths for use in generating the improved training data. Sampling of a segment of the subsurface configuration of a well may include taking/picking values of multiple subsurface properties (e.g., P-wave velocity, shear wave velocity, density, porosity, proportion of shale) at one or more depths for use in generating the improved training data. The portion of the segment from which the sampling is performed may be selected at random. For example, depths within the segment may be randomly selected to performing the sampling. For example, referring to FIG. 4, a sampling 450 may be performed within the segment A 402, with the depth of the sampling 450 randomly selected. The sampling 450 may take/pick the values of P-wave velocity ($V_P$), shear wave velocity ($V_S$), density ($\rho$), porosity ($\emptyset$), and proportion of shale ($V_{shale}$) from the randomly selected depth within the segment A 402 for use in generating the improved training data. Sampling of multiple subsurface properties may be performed for other segments of the well logs 400, such as the segment B 404 and the segment C 406. The sampling of the individual segments may be repeated to take/pick more values for use in generating the improved training data. For example, the sampling of the individual segments to generate the improved training data for the seismic inversion model(s) may be performed hundreds to thousands of times for the individual segments. For instance, referring to FIG. 4, sampling may be performed hundreds to thousands of times within each of the segment A 402, the segment B 404, and the segment C 406. Other number of sampling is contemplated.

The sampling of the individual segments may include separate random sampling with replacement of the multiple subsurface properties. Random sampling may refer to sampling being performed by selecting the sampling depth at random. Sampling with replacement may refer to sampling in which a sample that has been previously selected is returned for potential sampling before next sampling is performed. Thus, when a particular depth in a segment has been previously selected for sampling, that depth is not removed from future sampling but is returned for potential sampling in the future. For example, referring to FIG. 4, the depth at which sampling 450 has been performed may be selected again in a future sampling. The fact that this depth has previously been sampled may not have any effect on whether this depth will be selected for sampling in the future. Such sampling of the individual segments may result in the sampled values of subsurface properties reflecting the distribution of subsurface properties within the individual segments. That is, any bias in the sampled values may be derived from bias in the distribution of values in the individual segments. Thus, the subsurface configuration of the wells that are sampled are used as strong prior in the values sampled for use in generating the improved training data.

In some implementations, the separate random sampling with replacement of the multiple subsurface properties may be performed for a top layer, a bottom layer, and/or other layers. Modeling (e.g., forward modeling) of a subsurface region (seismic modeling) may require rock properties of multiple layers, such as a top layer and a bottom layer, to create layer geometry. For example, sampling of a top layer and a bottom layer may be used for a two-layer modeling. The rock properties for modeling may be obtained by randomly sampling the individual segments.

Random sampling of values for different layers may be performed independently. For example, referring to FIG. 4, the sampling 450 may be used to take/pick values of P-wave velocity, shear wave velocity, density, porosity, and/or proportion of shale for use as rock properties of the top layer in modeling. Another sampling within the segment A 402 may be performed to take/pick values of P-wave velocity, shear wave velocity, density, porosity, and/or proportion of shale for use as rock properties of the bottom layer in modeling. Even with a limited amount of well information (e.g., well logs) available, the sampling as described herein may be used to generate numerous (e.g., thousands from every segment) combinations of layer geometry for use in modeling. Individual combination of sampling may provide a scenario of layer geometry for use in modeling. Sampling for other numbers of layers and modeling using other numbers of layer is contemplated.

The sampled values of the subsurface properties may be used to perform modeling. The modeling may simulate seismic attributes and/or subsurface characteristics in a subsurface region using the sampled values of the subsurface properties. Seismic attributes may refer to characteristics of acoustic wave that travel through rock. Seismic attributes for a subsurface region may be derived from seismic data (seismic reflection response) for the subsurface region. Seismic attributes may be used to detect/predict presence and/or absence of particular materials (e.g., hydrocarbons) in a subsurface region. For example, seismic attributes may include amplitude attributes (including amplitude variation with angle/offset attributes), time/horizon attributes, frequency attributes, and/or other seismic attributes.

Subsurface characteristics may refer to attribute, quality, configuration, and/or characteristics of matter within a subsurface region. Subsurface characteristics may refer to physical arrangement, composition, properties, and/or characteristics of materials (e.g., subsurface elements) within a subsurface region. For example, the subsurface characteristics may include characteristics of rocks in a subsurface region, such as porosity, density, impedance (e.g., acoustic impedance, shear impedance), velocity (e.g., P-wave velocity, shear-wave velocity), and/or other characteristics of rocks in the subsurface region.

The values of multiple subsurface properties sampled from the segments may be used to perform modeling. Individual combinations of sampled values (e.g., a combination of values sampled for the top layer and the bottom layer) may be used to perform separate modeling. For example, separate forward modeling may be performed using separate combinations of sampled values. Forward modeling may generate synthetic seismic models of a subsurface region using the sampled values. Forward modeling may utilize the sampled values of multiple subsurface properties to calculate the seismic attributes in the subsurface region.

The improved training data may be generated to include information relating to the values of multiple subsurface properties sampled from the segments (e.g., the sampled valued, information determined/calculated from the sampled values), information relating to the seismic attributes obtained through modeling (e.g., the seismic attributes, information determined/calculated from the seismic attributes), and/or other information.

In some implementations, the improved training data may be generated by pairing up corresponding seismic attributes and subsurface characteristics. Particular seismic attributes that are present/expected from a subsurface region that has particular subsurface characteristics may correspond to one another. For example, sampled values of multiple subsurface properties for a top layer and a bottom layer may be used to perform an instance of forward modeling, and the seismic attributes and the subsurface characteristics from this instance of forward modeling may be paired up in the improved training data. The seismic attributes in the pairs may be used as input to be received by the seismic inversion model(s) and the subsurface characteristics in the pairs may be used as the truth to which the seismic inversion model(s) will be trained. Pairing up of other corresponding information is contemplated.

The improved training data may include pairings of corresponding (1) seismic attributes and (2) subsurface characteristics. For example, the improved training data may include pairing of (1) amplitude variation with angle/offset attributes (e.g., intercept, gradient, amplitude variation with angle/offset class, normal vector), P-wave velocity, shear wave velocity, fluid factor, depth below ocean bottom, and/or other seismic attributes, and (2) acoustic impedance, shear impedance, density, lithology, fluid type, porosity, layer thickness, net-to-gross, and/or other subsurface characteristics. Other pairings of seismic attributes and subsurface characteristics are contemplated.

Other information relating to the sampled values and/or modeling may be included in the improved training data. For example, seismic inversion may be desired to be performed for base layers, and the location of depth from which the base layer properties were sampled may be included in the improved training data as a feature. Inclusion of the depths of other layers and other information in the improved training data is contemplated.

Figure 5:
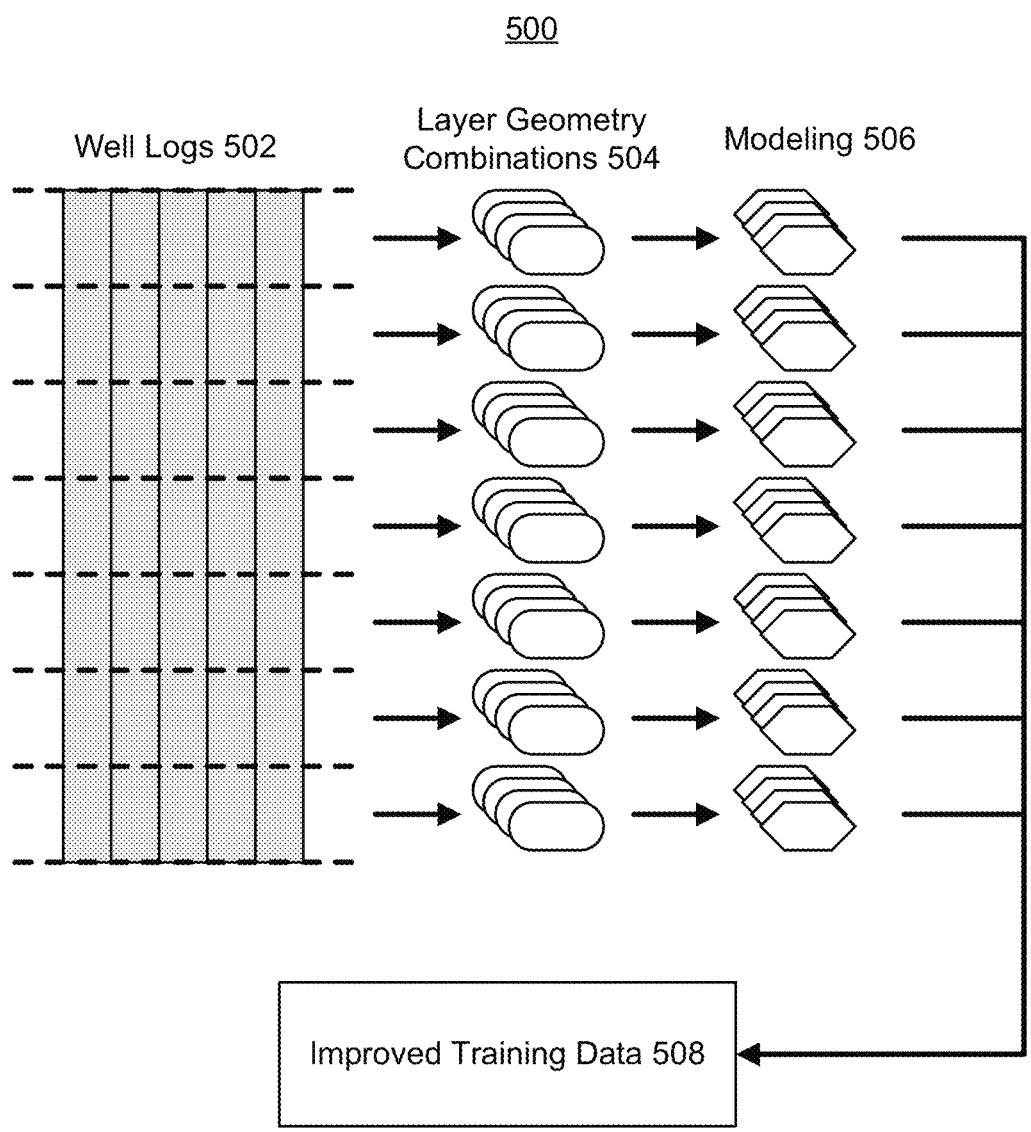
FIG. 5 illustrates an example diagram illustrating generation of improved training data.

FIG. 5 illustrates an example diagram 500 illustrating generation of improved training data. Well logs 502 may be divided into multiple segments, and random sampling with replacement may be performed multiple times (e.g., thousands of times) within individual segments of the well logs 502 to generate separate layer geometry combinations 504 (e.g., thousands of layer geometry combinations per segment). Individual layer geometry combination may be defined by values of subsurface properties sampled from the segments of the well logs 502 for a top layer, a bottom layer, and/or other layers. Separate layer geometry combinations 504 may be used to perform separate modeling 506, and seismic attributes and subsurface characteristics from the separate modeling 506 may be paired up for inclusion in the improved training data 508.

The train component 108 may be configured to train the seismic inversion model(s). The seismic inversion model(s) may be trained using the improved training data and/or other information. Training a seismic inversion model may include facilitating learning by the seismic inversion model by processing examples through the seismic inversion model. The pairings of corresponding seismic attributes and subsurface characteristics may be provided to the seismic inversion model as examples of input and desired results, respectively. The seismic attributes may be used as the type of input to be received by the seismic inversion model and the subsurface characteristics paired to the seismic attributes may be used as the type of output to be generated by the seismic inversion model. The seismic inversion model may adjust its weighted association to produce output that is similar to the result. Pairing of other information to train the inversion model is contemplated.

A trained seismic model may provide estimation/prediction of the subsurface characteristics in a subsurface region based on the seismic attributes for the subsurface region. That is, when the seismic attributes of a subsurface region are input into a trained seismic model, the trained seismic model may output the estimated/predicted subsurface characteristics in the subsurface region. The trained seismic model may output information from which the subsurface characteristics in the subsurface region may be estimated/predicted. The trained seismic model may perform machine learning seismic inversion of the subsurface attributes.

The storage component 110 may be configured to store the trained seismic inversion model(s). The trained seismic inversion model(s) may be stored in one or more non-transient storage media and/or other storage media. For example, the storage component 110 may store the trained seismic inversion model(s)/information defining the trained seismic inversion model(s) in a storage location, such as the electronic storage 13, electronic storage of a device accessible via a network, and/or other locations. The trained seismic inversion model(s) may be stored for use in determining (e.g., estimating, predicting) subsurface characteristics of a subsurface region/performing seismic inversion. The trained seismic inversion model(s) may be stored for retrieval/running when determining subsurface characteristics of a subsurface region/performing seismic inversion.

The seismic reflection component 112 may be configured to obtain seismic reflection information and/or other information. Obtaining seismic reflection information may include one or more of accessing, acquiring, analyzing, creating, determining, examining, generating, identifying, loading, locating, measuring, opening, receiving, retrieving, reviewing, selecting, storing, utilizing, and/or otherwise obtaining the seismic reflection information. The seismic reflection component 112 may obtain seismic reflection information from one or more locations. For example, the seismic reflection component 112 may obtain seismic reflection information from a storage location, such as the electronic storage 13, electronic storage of a device accessible via a network, and/or other locations. The seismic reflection component 112 may obtain seismic reflection information from one or more hardware components (e.g., a computing device, a component of a computing device) and/or one or more software components (e.g., software running on a computing device). In some implementations, the seismic reflection information may be obtained from one or more users. For example, a user may interact with a computing device to input, upload, identify, and/or select the seismic reflection response to be used, and the seismic reflection information for the seismic reflection response may be obtained. The seismic reflection information may be stored within a single file or multiple files.

The seismic reflection information may define seismic reflection response in a subsurface region. A subsurface region may refer to a part of earth located beneath the surface/located underground. A subsurface region may refer to a part of earth that is not exposed at the surface of the ground. A subsurface region may include a reservoir. A reservoir may refer to a location at which one or more resources are stored. For example, a reservoir may refer to a location at which hydrocarbon are stored. For instance, a reservoir may refer to a location including rocks in which oil and/or natural gas have accumulated. A subsurface region may include one or more subsurface features. A subsurface feature may refer to a distinctive attribute, aspect, and/or element within the subsurface region. A subsurface feature may relate to/be defined by geometry and/or composition of materials within the subsurface region.

Seismic reflection response in a subsurface region may refer to how acoustic waves travel through the subsurface region and/or reflect off one or more subsurface features within the subsurface region. Seismic reflection response in a subsurface region may refer to one or more characteristics of acoustic wave that move through the subsurface region. For example, seismic reflection response in subsurface region may refer to characteristics of the acoustic wave (e.g., velocity, amplitude, frequency) and the time it takes for the acoustic wave to travel down through the subsurface region and reflect back from an interface between different layers in the subsurface region.

The seismic reflection information may define seismic reflection response in a subsurface region by including information that defines one or more content, qualities, attributes, features, and/or other aspects of the seismic reflection response in the subsurface region. For example, the seismic reflection information may define seismic reflection response in a subsurface region by including information that makes up seismic reflection response measured in the subsurface region and/or information that is used to determine the seismic reflection response measured in the subsurface region. Other types of seismic reflection information are contemplated.

The seismic inversion component 114 may be configured to determine subsurface characteristics in the subsurface region. Determining subsurface characteristics may include ascertaining, approximating, calculating, establishing, estimating, finding, identifying, obtaining, performing, predicting, quantifying, and/or otherwise determining the subsurface characteristics. The subsurface characteristics in the subsurface region may be determined by performing seismic inversion of the seismic reflection response in the subsurface region using one or more trained seismic inversion model(s). The seismic reflection response in the subsurface region and/or other information determined from the seismic reflection response may be input into the trained seismic inversion model(s). In response to the seismic reflection response/information determined from the seismic reflection response being input into the trained seismic inversion model(s), the trained seismic inversion model(s) may output the subsurface characteristics in the subsurface region. In some implementations, the trained seismic inversion model(s) may output information from which the subsurface characteristics in the subsurface region may be determined.

In some implementations, the seismic reflection response in the subsurface region may be calibrated, and seismic attributes may be computed from the calibrated seismic reflection response. The seismic reflection response may depend on dynamic range, and the seismic reflection response may be calibrated to match the well-based models. For example, the seismic reflection response may be calibrated based on shale-shale reflectivity. Shale intervals may be common and relatively easy to identify in seismic reflection response as regional features with low reflectivity. Shale-shale reflectivity may have a systematic amplitude variation with angle/offset response that may be exploited for efficient and accurate seismic reflection response calibration. Seismic attributes, such as amplitude variation with angle/offset attributes (e.g., intercept, gradient, amplitude variation with angle/offset class, normal vector), P-wave velocity, shear wave velocity, fluid factor, depth below ocean bottom, and/or other seismic attributes may be determined based on the calibrated seismic reflection response and/or other information.

The trained seismic inversion model(s) may be applied to the seismic attributes to perform the seismic inversion of the seismic reflection response in the subsurface region. Rather than inputting the seismic reflection response into the inversion model(s), the seismic attributes (e.g., computed from the calibrated seismic reflection response) may be input into the inversion model(s), and the seismic inversion model(s) may use the seismic attributes to output the subsurface characteristics of the subsurface region. The seismic inversion model(s) may perform the seismic inversion using the seismic attributes derived from the seismic reflection response instead of directly using the seismic reflection response. Other usage of the seismic inversion model(s) is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2A:
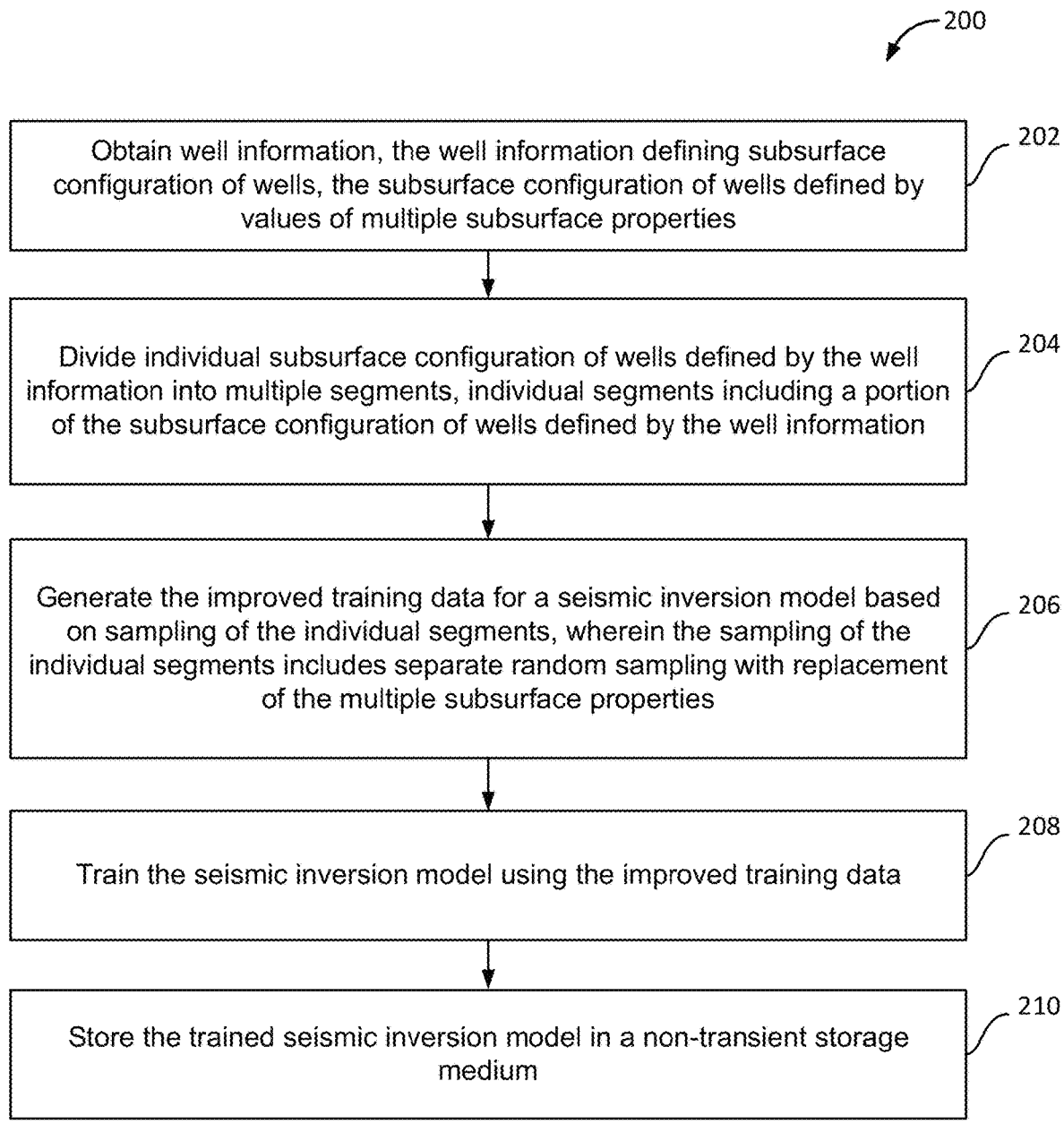
FIG. 2A illustrates an example method for improving seismic inversion using improved training data.
Figure 2B:
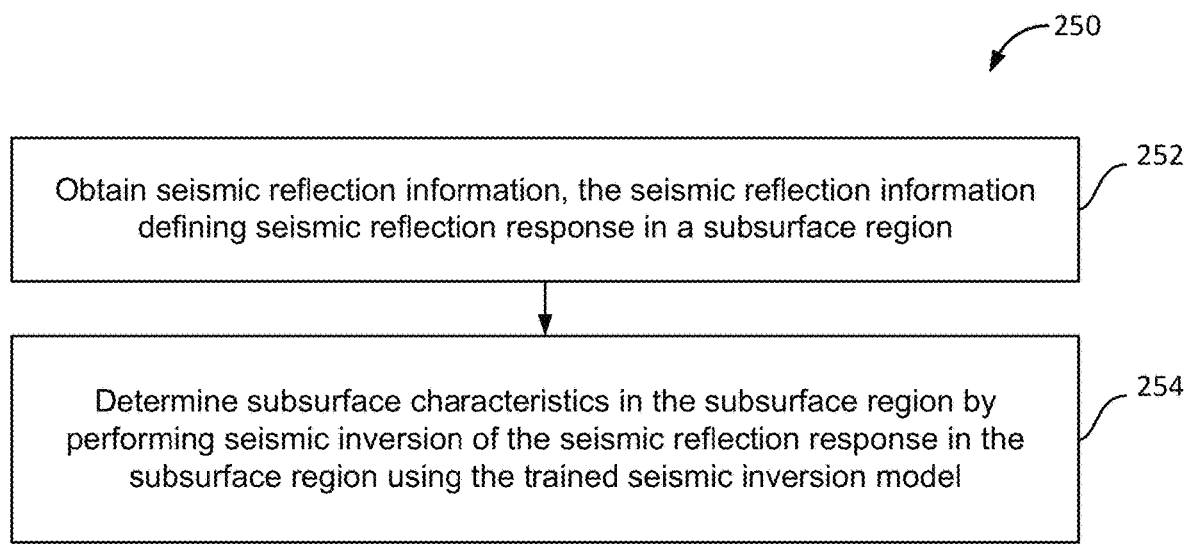
FIG. 2B illustrates an example method for improving seismic inversion using improved training data.

FIGS. 2A and 2B illustrate methods 200, 250 for improving seismic inversion using improved training data. The operations of methods 200, 250 presented below are intended to be illustrative. In some implementations, methods 200, 250 may be accomplished with one or more additional operations not described, and/or without one or more of the operations discussed. In some implementations, two or more of the operations may occur substantially simultaneously.

In some implementations, methods 200, 250 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2A and method 200, at operation 202, well information and/or other information may be obtained. The well information may define subsurface configuration of wells. The subsurface configuration of wells may be defined by values of multiple subsurface properties. In some implementation, operation 202 may be performed by a processor component the same as or similar to the well component 102 (Shown in FIG. 1 and described herein).

At operation 204, individual subsurface configuration of wells defined by the well information may be divided into multiple segments. Individual segments may include a portion of the subsurface configuration of wells defined by the well information. In some implementation, operation 204 may be performed by a processor component the same as or similar to the division component 104 (Shown in FIG. 1 and described herein).

At operation 206, the improved training data for a seismic inversion model may be generated based on sampling of the individual segments and/or other information. The sampling of the individual segments may include separate random sampling with replacement of the multiple subsurface properties. In some implementation, operation 206 may be performed by a processor component the same as or similar to the improved training data component 106 (Shown in FIG. 1 and described herein).

At operation 208, the seismic inversion model may be trained using the improved training data. In some implementation, operation 208 may be performed by a processor component the same as or similar to the train component 108 (Shown in FIG. 1 and described herein).

At operation 210, the trained seismic inversion model may be stored in a non-transient storage medium. In some implementation, operation 210 may be performed by a processor component the same as or similar to the storage component 110 (Shown in FIG. 1 and described herein).

Referring to FIG. 2B and method 250, at operation 252, seismic reflection information and/or other information may be obtained. The seismic reflection information may define seismic reflection response in a subsurface region. In some implementation, operation 252 may be performed by a processor component the same as or similar to the seismic reflection component 112 (Shown in FIG. 1 and described herein).

At operation 254, subsurface characteristics in the subsurface region may be determined by performing seismic inversion of the seismic reflection response in the subsurface region using the trained seismic inversion model. In some implementation, operation 254 may be performed by a processor component the same as or similar to the seismic inversion component 114 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for improving seismic inversion using improved training data, the system comprising:
    one or more physical processors configured by machine-readable instructions to:
        obtain well information, the well information defining subsurface configuration of wells, the subsurface configuration of wells defined by values of multiple subsurface properties;
        divide individual subsurface configuration of wells defined by the well information into multiple segments, individual segments including a portion of the subsurface configuration of wells defined by the well information;
        generate the improved training data for a seismic inversion model based on sampling of the individual segments, wherein the sampling of the individual segments includes separate random sampling with replacement of the multiple subsurface properties, wherein the separate random sampling with replacement of the multiple subsurface properties is performed for a top layer and a bottom layer;
        train the seismic inversion model using the improved training data; and
        store the trained seismic inversion model in a non-transient storage medium.

2. The system of claim 1, wherein the one or more physical processors are further configured by the machine-readable instructions to:

obtain seismic reflection information, the seismic reflection information defining seismic reflection response in a subsurface region; and determine subsurface characteristics in the subsurface region by performing seismic inversion of the seismic reflection response in the subsurface region using the trained seismic inversion model.

3. The system of claim 2, wherein the seismic reflection response is calibrated and seismic attributes are computed from the calibrated seismic reflection response, further wherein the trained seismic inversion model is applied to the seismic attributes to perform the seismic inversion of the seismic reflection response in the subsurface region.

4. The system of claim 3, wherein the improved training data includes pairings of corresponding seismic attributes and subsurface characteristics.

5. The system of claim 4, wherein the subsurface characteristics include acoustic impedance, shear impedance, and density.

6. The system of claim 1, wherein the individual segments cover a range of tens to hundreds of feet.

7. The system of claim 6, wherein the sampling of the individual segments to generate the improved training data for the seismic inversion model is performed hundreds to thousands of times for the individual segments.

8. The system of claim 1, wherein the wells include one or more synthetic wells, and the subsurface configuration of the wells defined by the well information includes synthetic subsurface configuration of the one or more synthetic wells.

9. The system of claim 8, wherein the one or more synthetic wells are generated from one or more real wells by varying sand properties of the one or more real wells while retaining shale properties of the one or more real wells.

10. A method for improving seismic inversion using improved training data, the method comprising:

obtaining well information, the well information defining subsurface configuration of wells, the subsurface configuration of wells defined by values of multiple subsurface properties;

dividing individual subsurface configuration of wells defined by the well information into multiple segments, individual segments including a portion of the subsurface configuration of wells defined by the well information;

generating the improved training data for a seismic inversion model based on sampling of the individual segments, wherein the sampling of the individual segments includes separate random sampling with replacement of the multiple subsurface properties, wherein the separate random sampling with replacement of the multiple subsurface properties is performed for a top layer and a bottom layer;

training the seismic inversion model using the improved training data; and storing the trained seismic inversion model in a non-transient storage medium.

11. The method of claim 10, further comprising:

obtaining seismic reflection information, the seismic reflection information defining seismic reflection response in a subsurface region; and determining subsurface characteristics in the subsurface region by performing seismic inversion of the seismic reflection response in the subsurface region using the trained seismic inversion model.

12. The method of claim 11, wherein the seismic reflection response is calibrated and seismic attributes are computed from the calibrated seismic reflection response, further wherein the trained seismic inversion model is applied to the seismic attributes to perform the seismic inversion of the seismic reflection response in the subsurface region.

13. The method of claim 12, wherein the improved training data includes pairings of corresponding seismic attributes and subsurface characteristics.

14. The method of claim 13, wherein the subsurface characteristics include acoustic impedance, shear impedance, and density.

15. The method of claim 10, wherein the individual segments cover a range of tens to hundreds of feet.

16. The method of claim 15, wherein the sampling of the individual segments to generate the improved training data for the seismic inversion model is performed hundreds to thousands of times for the individual segments.

17. The method of claim 10, wherein the wells include one or more synthetic wells, and the subsurface configuration of the wells defined by the well information includes synthetic subsurface configuration of the one or more synthetic wells.

18. The method of claim 17, wherein the one or more synthetic wells are generated from one or more real wells by varying sand properties of the one or more real wells while retaining shale properties of the one or more real wells.

* * * * *